2 Sheets--Sheet 1.

F. CURTIS & E. P. RUSSELL.

Pump.

No. 6,357. Reissued March 30, 1875.

Witnesses:
Ernst Bilhuber.
Chas. Wahlers.

Inventors:
Francis Curtis
Edward P. Russell
per
Van Santvoord & Hauff
Attys

THE GRAPHIC CO. PHOTO-LITH. 39 & 41 PARK PLACE, N.Y.

2 Sheets--Sheet 2.

F. CURTIS & E. P. RUSSELL.

Pump.

No. 6,357. Reissued March 30, 1875.

Witnesses:
Ernst Bilhuber.
Chas. Wahlen.

Inventors:
Francis Curtis
Edward P. Russell
per
Van Santvoord & Hopf
Attys

THE GRAPHIC CO. PHOTO-LITH. 39 & 41 PARK PLACE, N.Y.

UNITED STATES PATENT OFFICE

FRANCIS CURTIS AND EDWARD P. RUSSELL, OF NEWBURYPORT, MASS.

IMPROVEMENT IN PUMPS.

Specification forming part of Letters Patent No. 154,785, dated September 8, 1874; reissue No. 6,357, dated March 30, 1875; application filed January 20, 1875.

*To all whom it may concern:*

Be it known that we, FRANCIS CURTIS and EDWARD P. RUSSELL, both of Newburyport, in the county of Essex and State of Massachusetts, have invented a certain new and useful Improvement in Pumps, of which the following is a specification:

This invention is illustrated in the accompanying drawing, in which—

Figure 1:
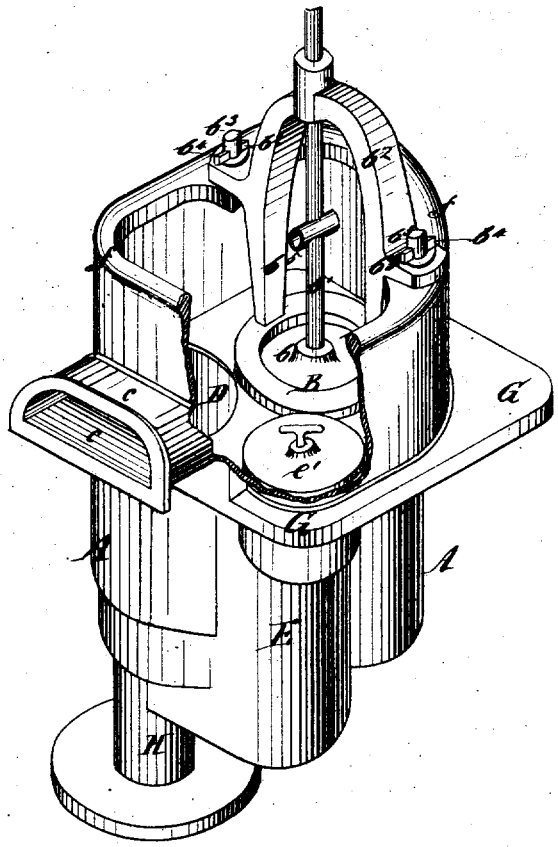
Figure 3:
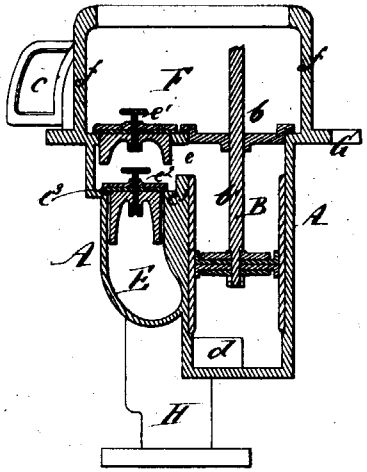
Figure 2:
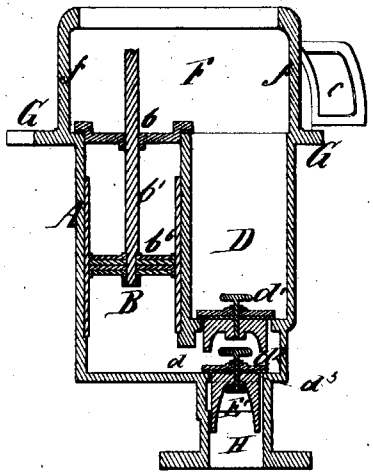

Figure 1 is a perspective view of this improvement, part of the wall of the basin being broken away to show the tops of the piston-cylinder and of the valve wells or cylinders. Figs. 2 and 3 are vertical sections of the same, the stay or bridge piece which forms a guide for the piston-rod being removed from view in both the Figs. 2 and 3.

Similar letters indicate corresponding parts.

This invention consists of a double-acting pump, having a piston-cylinder, and two valve cylinders or wells containing double sets of valves, the piston and valve-cylinders being so arranged that their upper ends terminate in an open basin, into which the valve-cylinders discharge their contents, and through which free access is had to all three cylinders and to the several valves.

The openings in the seats of the upper valves of each valve cylinder or well are of greater size or diameter than the lower valves, so that the lower valves, as well as the upper valves, can be readily removed and replaced through the open part of the basin. The basin extends over all the three cylinders, and one side of the basin is provided with a discharge-spout, through which the water raised by the pump is discharged.

The piston-cylinder is closed by a cap, which is held down by the ends of a stay or bridge-piece, in whose upper side the piston-rod of the pump is guided, the stay or bridge piece being fastened to the pump by means of ears, which overlap and are secured to the walls of the basin by appropriate means.

Our improvement enables us to cast the piston and valve-cylinders and induction-pipe and basin in one piece, and to combine cheapness and simplicity of construction with easy access to the working parts of the pump for removing and replacing them.

The letter A designates a pump containing our invention, in which B is the piston-cylinder, and D E are a pair of valve cylinders or wells, each of which contains an inlet and an outlet valve. The three cylinders B, D, and E extend up through the top plate of the pump, where they terminate in a common basin, F, whose wall rises from the top plate of the pump; and into which basin the water or liquid lifted by the pump is discharged from the valve-cylinders. All the cplinders B D E open directly into this basin, and are, therefore, accessible and exposed to view from above through the basin. C is a nozzle or spout formed in the side of the basin F, the center of which is in a line with the center of the basin F and of the main or piston cylinder B. The cylinder B is provided with a cap or cover, *b*, through which the piston-rod *b'* passes. *d e* are ports or openings formed at the lower and upper ends of the cylinder B, the lower port *d* being connected with the cylinder D, and the upper *e* with the cylinder E. The valve-cylinders D E are provided with puppet-valves $d^1$ $d^2$ and $e^1$ $e^2$, arranged above and below the ports or openings *d e*, as shown. The seats $d^3$ $e^3$ of the valves $d^1$ $d^2$ $e^1$ $e^2$ are formed of chilled metal, and are placed round the cores which form the cylinders when arranging the molds for casting the pump; and when the metal of which the pump is to be formed is run into the mold and allowed to cool, they form part of the cylinders, in proper position to receive the valves without further fitting.

The valves and valve-seats of each cylinder are directly over each other, and the openings in the seats of the outlet or eduction valves $d^1$ $e^1$ are made of greater size or diameter than the inlet-valves $d^2$ $e^2$, so as to permit the inlet-valves to be taken out through the seats of the eduction-valves, and replaced at pleasure, the valve-cylinders or wells D E above their valve-seats being made large enough to allow the valves to pass through them without difficulty.

The upper edges of the main cylinder B and the cylinders D E are arranged in a line with the bottom of the basin F. The cap or cover *b* for the cylinder B is retained in position by means of the cross-stay $b^2$, secured to the upper edge of the wall *f* of the basin F, by means of studs $b^3$, which pass through holes in the stay $b^2$, and are secured by means of keys $b^4$, passing through studs $b^3$. In the center of the stay $b^2$ the bearing for the piston-rod $b^1$ is formed, and on the under side it is provided with vertical projections or legs $b^5$, which, when the cap or cover $b$ and the stay $b^2$ are in position, press firmly on the cap or cover $b$, and retain the same firmly in position, while at the same time, when it is required to remove the piston, it is simply necessary to take out the keys $b^4$, and by drawing out the piston-rod $b^1$, the piston $b^6$, cap $b$, and the stay $b^2$, and retaining projections or legs $b^5$, may be all removed together from above the water-line. G is a flange, arranged around the case A, for the purpose of retaining the pump in position. The suction-pipe H is formed in the main casting by the continuation of the cylinder D, the cylinder E being provided with a passage, E′, leading thereto.

By this arrangement of pump, the main cylinder B and the valve-cylinders D E all open into the basin F, and the valves $d^1$ $d^2$ and $e^1$ $e^2$, as well as the cylinder head or cover $b$, will be constantly flooded, thereby making all the joints air-tight, and the valves $d^1$ $d^2$ and $e^1$ $e^2$ may be readily removed and replaced without the necessity of unscrewing bolts or other retaining means, as is usual in this class of pumps.

It will also be seen that the whole of the working parts of the pump, with the exception of the basin and the parts immediately connected therewith, may be placed below the deck or platform of a ship, or other place, to which they are affixed, and that, in case of need, the parts of one pump may be interchanged with those of another; and, further, that when employing these improved pumps in pairs, as is usual on board ship, it is not necessary to form the same right and left handed, as the nozzles or spouts, being central as well as the cylinders B, they can be readily connected with the operating-lever, and with the means of conducting away the water or liquid raised.

In place of the cylinders B D E being arranged in a triangle, they may be placed in a line with the cylinder B in the center.

It will be readily seen by persons acquainted with the action of pumps, that the piston $b^6$ being set in motion by means of the rod $b^1$, water will be drawn into the cylinder B at the upper and lower ends, alternately, from the induction-pipe H through the inlet-valves $e^2$ $d^2$, and will be forced out, through the outlet-valves $e^1$ $d^1$, into the common basin F, from which it will run off through the nozzle or spout C.

The body of the pump, including the cylinders B D E, and induction-pipe H and basin F, with it spout, and the flange G, can be cast in one piece, the cores for the valve-wells D E, and piston-cylinder B, and the induction-pipe being formed and supported on the core, forming the inside of the basin, whereby the whole body of the pump is formed of a single connected casting, all the valve-seats being formed and finished in molding the valve-wells, and no additions or supplementry parts being required afterward to form or complete the main body of the pump.

What we claim as new, and desire to secure by Letters Patent, is—

1. In a double-acting pump, the combination of an open water-basin with two valve-wells, each provided with inlet and discharge valves, and opening and discharging their contents into the basin, substantially as shown and described.

2. The combination in a double-acting pump of the valve-wells D E, each provided with inlet and discharge valves, and piston-cylinder B, with an open water-basin extending over said valve-wells and piston-cylinder, said valve-wells discharging their contents into the basin, substantially as shown and described.

3. The cross-stay $b^2$, secured to the basin, and forming a guide for the piston-rod of the pump, and provided with legs $b^5$ for holding the cap or cover $b$ in place, substantially as shown and described.

4. The combination, with the cross-stay $b^2$ and its legs $b^5$, of the studs $b^3$, passing through holes in the cross-stay and keys $b^4$, whereby the cross-stay $b^2$ and cap $b$ are secured without requiring screws or bolts, substantially as shown and described.

5. The combination, with the casing A formed with a main or piston cylinder, a pair of valve cylinders D E, and a basin, F, having a central nozzle, C, all cast in one piece, and provided with studs $b^3$, as described, of the stay $b^2$, provided with a bearing for the piston-rod $b^1$, and vertical projections $b^5$, for retaining the cap or cover $b$ in position, substantially as set forth.

6. The piston-cylinder B and its head $b$, in combination, with the projections $b^5$, of the bridge piece $b^2$, substantially as and for the purpose specified.

In testimony that we claim the foregoing we have hereunto set our hands and seals this 15th day of January, 1875.

FRANCIS CURTIS. [L. S.]
EDWARD P. RUSSELL. [L. S.]

Witnesses:
JOHN N. PIKE,
WM. A. GOULD.